(12) United States Patent  (10) Patent No.: US 9,009,001 B2
Vass et al.  (45) Date of Patent: Apr. 14, 2015

(54) MONITORING FOR INVALID DATA FROM FIELD INSTRUMENTS

(75) Inventors: Jiri Vass, Prague (CZ); Ard Van Schie, Honselersdijk (NL)

(73) Assignee: Honeywell International Inc., Morristown, NJ (US)

( * ) Notice: Subject to any disclaimer, the term of this patent is extended or adjusted under 35 U.S.C. 154(b) by 556 days.

(21) Appl. No.: 13/116,364

(22) Filed: May 26, 2011

(65) Prior Publication Data

US 2012/0303321 A1  Nov. 29, 2012

(51) Int. Cl.
G06F 19/00 (2011.01)
G05B 23/02 (2006.01)
G05B 9/02 (2006.01)

(52) U.S. Cl.
CPC .............. *G05B 23/0221* (2013.01); *G05B 9/02* (2013.01)

(58) Field of Classification Search
USPC ......................................................... 702/179
See application file for complete search history.

(56) References Cited

U.S. PATENT DOCUMENTS

| | | | |
|---|---|---|---|
| 5,438,460 A * | 8/1995 | Coker et al. ..................... | 360/46 |
| 5,602,761 A | 2/1997 | Spoerre et al. | |
| 6,594,620 B1 | 7/2003 | Qin et al. | |
| 6,598,195 B1 * | 7/2003 | Adibhatla et al. ............ | 714/745 |
| 7,855,562 B2 | 12/2010 | Chiaburu et al. | |
| 2006/0074558 A1 | 4/2006 | Williamson et al. | |
| 2008/0015814 A1 * | 1/2008 | Harvey et al. .................. | 702/179 |
| 2009/0043405 A1 | 2/2009 | Chester et al. | |
| 2010/0299105 A1 | 11/2010 | Vass et al. | |

OTHER PUBLICATIONS

Dunia, Ricardo, et al., "Identification of faulty sensors using principal component analysis", AIChE Journal, 42(10), (Oct. 1996), 2797-2812.

Firoozshahi, A., "Innovative Tank Management System based on DCS", 2010 Proceedings—ELMAR, (2010), 323-328.

Koushanfar, F., et al., "On-line fault detection of sensor measurements", Proceedings of IEEE Sensors, vol. 2, (2003), 974-979.

* cited by examiner

*Primary Examiner* — Tung S Lau
(74) *Attorney, Agent, or Firm* — Schwegman Lundberg & Woessner, P.A.

(57) ABSTRACT

Processing systems and methods used to identify faults in the operation of one or more field instruments are described and shown. In one embodiment, a sensing system includes one or more field instruments and a processing component configured to process data from the field instruments. This processing may include identifying invalid samples of data using an algorithm; correlating invalid samples of data to specific field instruments; and determining a likelihood of a fault occurring on the specific field instruments. The processing may occur in real-time using an online processing technique, or with an offline processing technique on data maintained in a data store.

13 Claims, 6 Drawing Sheets

MONITORING FOR INVALID DATA FROM FIELD INSTRUMENTS

BACKGROUND

Sensor instruments and systems are deployed in a variety of consumer, industrial, and commercial applications. As an example of sensor deployment in a common industrial setting, tank farms and tank terminals provide a series of storage tanks containing various products (e.g. petrochemicals) that pass through different stages of a processing workflow. High accuracy and reliability of field instruments (e.g. level sensors and temperature sensors) is needed for precise volume calculations in these storage tanks. However, field instruments may, under certain conditions, generate invalid data, such as data jumps, out-of-range data, excessive variance (noise), frozen readings, missing data, and the like. Invalid sensor readings may pose a safety issue and may also cause financial losses if undetected.

Invalid or inaccurate sensor data may be caused by a variety of factors, including: sensor fault (mechanical or electrical) initiated by various damage mechanisms (e.g. water ingress), power outages, communication errors, incorrect value of instrument parameters, and the like. Although some field instruments may already be equipped with some level of on-board diagnostic functionality, the existing diagnostic algorithms deployed in sensors and in sensor monitoring systems may not be able to detect all cases of invalid data.

SUMMARY

Various processing systems and techniques are described herein that enable the recognition of invalid data and faults occurring in field instruments. In one embodiment, a sensing system includes a field instrument and a processing component coupled to the field instrument. The processing component may be configured to process data from the field instrument in real-time using online data processing techniques and systems, or at later times using offline data processing techniques and systems. Invalid samples of data from the field instruments may be identified using a filtering algorithm. From the results of the filtering algorithm, a likelihood of a fault occurring in the field instrument may be determined.

In further embodiments, the processing component may be configured to monitor multiple field instruments and correlate invalid samples of the data to one or more specific field instruments from the multiple field instruments. The likelihood of a fault occurring in the field instrument may be further interpreted to provide transmission of a warning, error message, or other information about the field instrument to an appropriate user.

DETAILED DESCRIPTION

Figure 1:
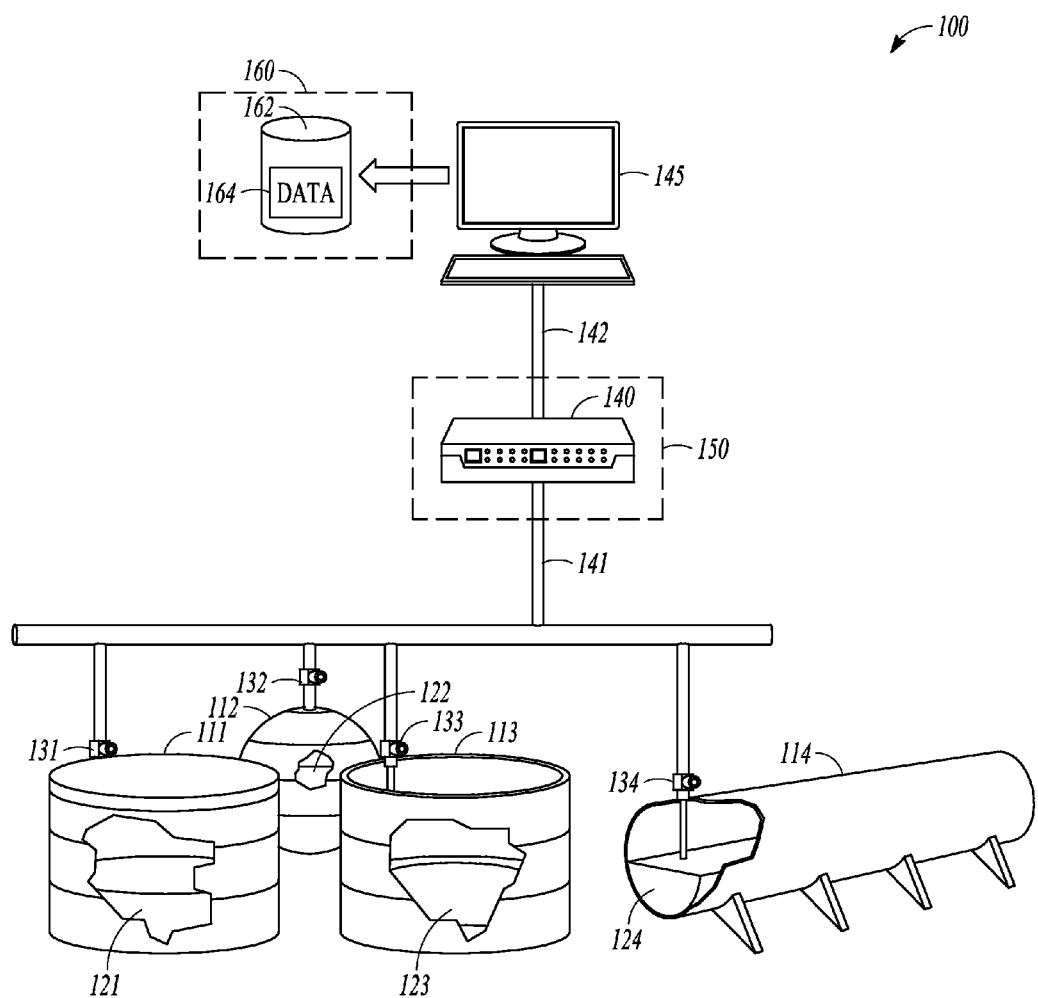
FIG. 1 depicts an example embodiment of a monitoring system connected to a plurality of field instruments in an illustrative tank farm configuration.

In the following description, reference is made to the accompanying drawings that form a part hereof, and in which is shown by way of illustration specific embodiments that may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human or enterprise implemented procedures in one embodiment. The software may consist of computer executable instructions stored on computer readable media such as memory or other type of storage devices. Further, such functions correspond to modules, which are software, hardware, firmware, or any combination thereof. Multiple functions may be performed in one or more modules as desired, and the embodiments described are merely examples. The software may be executed on a digital signal processor, application-specific integrated circuit (ASIC), microprocessor, or other type of processor operating on a computer system, such as a personal computer (PC), server or other computer system.

A series of techniques and systems disclosed herein enable enhanced monitoring of measured data from field instruments, and may be deployed to detect and prevent problems and faults originating from invalid data. In one embodiment, a monitoring system is configured to collect or process data in connection with a product being evaluated by a plurality of field instruments. Such field instruments include, but are not limited to, gauges, sensors, or probes. The monitoring system may be configured to process the data and automatically detect or recognize any abnormal events or faults from the data values of the various field instruments.

The monitoring system may then perform additional filtering steps, rule-based reasoning, correlations, and indications in connection with the invalid data processing steps. Further, a likelihood of a fault occurring in a specific field instrument may be determined from an abnormal set of data. Upon processing and the determination of abnormal events, invalid data, or specific faults, appropriate action, such as alerts and automated corrections, may be performed.

The following describes a number of algorithms and techniques deployed in real-world examples with storage tanks and tank farms. It should be understood that the algorithms and techniques described herein would apply to a variety of configurations for sensor systems and performing a detection of invalid data generated by field instruments and other types of sensors generally. Therefore use of the presently described embodiments in a tank farm or other product storage setting is only provided as a specific example, and is not intended to limit the wider scope or applicability of the invention to other types of field instruments that do not involve tanks or product storage monitoring.

FIG. 1 illustrates an example monitoring system 100 deployed in a tank farm, the tank farm providing storage facilities 111, 112, 113, 114 for a set of products 121, 122, 123, 124 viewable in cut out portions of the respective storage facilities. The tank farm is configured to have the monitoring system 100 actively monitor the sets of products 121, 122, 123, 124 in each facility using a plurality of field instruments 131, 132, 133, 134 connected to a data collection or processing unit 140 via network 141.

The processing unit 140 may be configured to implement analysis of data collected from the field instruments with an online algorithm 150, or may collect the data for later processing with an offline algorithm 160 by the storage of archived data 164 in database 162. The processing unit 140 may be further connected to a management user interface, such as may be provided in computer system 145 via network connection 142. The management user interface may enable real-time or delayed user monitoring and control of the variety of components presented in tank farm monitoring system 100.

The field instruments 131, 132, 133, 134 deployed in the tank farm monitoring system 100 include a product level gauge (e.g., a radar gauge or servo gauge), and various sensors, probes, and associated data transmitters to monitor storage conditions for products 121, 122, 123, 124. In the tank farm industry, the term "product" generally refers to the contents of the storage tank. As various examples of product being monitored in a tank farm setting, product may include stored liquid or gas, such as crude oil, jet fuel, liquid natural gas, and the like. Key measured storage variables for liquid or gas product are product level, product temperature, product pressure, product flow, product density, vapor temperature, vapor pressure, water level, and the like.

A field instrument may comprise a gauge, sensor, or probe, although many other types of instruments and monitoring units may be used. In one embodiment, a field instrument simply measures some physical variable (hence it is a sensor); but various types of field instruments may be configured with increasing complexity to also perform computations, generate error codes, and receive commands to perform certain actions or analysis. Therefore, the field instrument may include a wide level of integrated processing, or may provide raw data for analysis in a larger monitoring system.

A field instrument and its associated data transmitter may include one or more sets of sensors. For example, a temperature probe placed in a storage tank may consist of multiple vertically arranged temperature elements, and may optionally include a water level probe for placement near the bottom of the tank. Some of the data measured by field instruments might include product level (by radar or servo gauge); storage pressure conditions; product temperature (by temperature probe); vapor temperature (by temperature probe); product density (by servo gauge); water level (by water level probe); and external data potentially relevant to the monitored product (e.g. weather conditions such as ambient temperature, ambient humidity, barometric pressure, and wind speed external to the storage location).

Figure 2:
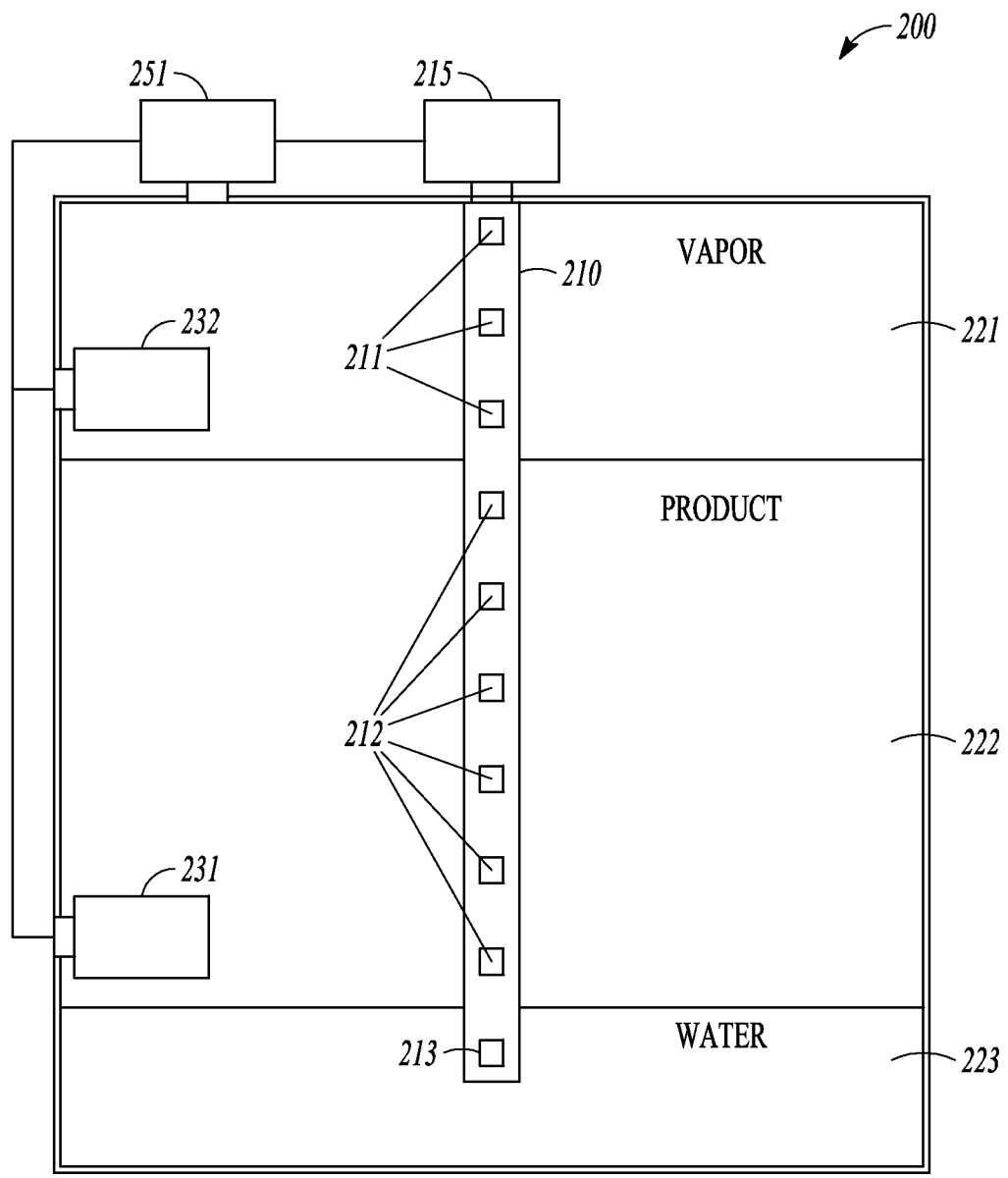
FIG. 2 depicts an example embodiment of a monitoring system connected to a plurality of field instruments in an illustrative tank configuration.

FIG. 2 provides an illustration of a deployment of a plurality of field instruments in a cross-section of a petrochemical storage tank 200. As illustrated, a probe 210 used in tank 200 consists of sets of multiple temperature elements 211, 212 and a water probe 213 located in a vertical column and distributed uniformly at specific heights from the tank bottom to the tank top. The probe 210 may provide a data interface 215 that is connected to other field instruments (such as level gauge 251) or external data monitoring systems (not shown).

The product provided within tank 200 has separated into vapor 221, product (liquid) 222, and water 223. Other field instruments monitoring the tank may include pressure transmitter 231 for monitoring product pressure provided by hydrostatic pressure, pressure transmitter 232 for monitoring vapor pressure, and level gauge 251 for monitoring the level of product within the tank 200. Other field instruments such as a flowmeter may be integrated with the tank, or located internally or externally to the tank. As another example, field instruments external to the tank 200 might include sensors for wind speed, ambient temperature, ambient humidity, and barometric pressure.

As previously mentioned, the temperature probe 210 includes a plurality of sets of temperature elements 211, 212, 213. The temperature elements 211 are not immersed in the illustrated state of the tank but provide temperature monitoring for the vapor portion of the tank, whereas temperature elements 212 have become immersed in liquid and provide a temperature indication of the product 222 at the various liquid levels of the tank. Further, water probe 213 residing near the bottom of the tank will monitor the level of the water contents, which have become separated from the product 222.

As a typical monitoring example, the individual sensor readings such as temperatures from individual elements within temperature probe 210 may be averaged to obtain the average product temperature (computed using data from submerged elements) and average vapor temperature (computed using data from non-submerged elements) for the tank. The resulting average values may then be archived in a supervisory software application, where a typical logging period is between 1 and 15 minutes. The archiving process is applied also to other types of measured and calculated data, such as product level, water level, product volume, product mass, and the like.

Once the data is collected from the field instruments, various anomalies may be detected from this data. This may be used for the purpose of determining if a particular sensor is providing abnormal data (even if the sensor reports a normal status). In one embodiment, the monitoring system seeks to perform the monitoring of a plurality of field Instruments with a mathematical algorithm and fault detection techniques to process and extract useful data points and analysis from the data.

Figure 3A:
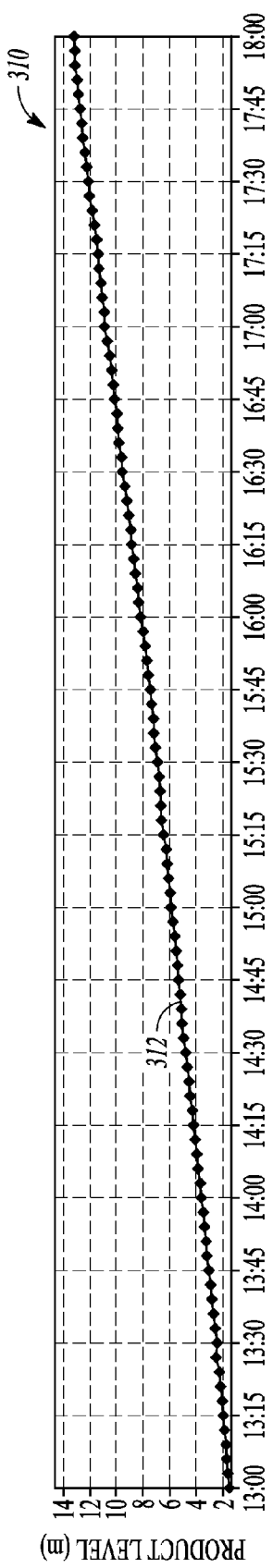
FIGS. 3A, 3B, and 3C depict example graphs of product level, product temperature, and product temperature status indicating of data jumps produced by field instruments monitored in connection with an example embodiment of a monitoring system.
Figure 3B:
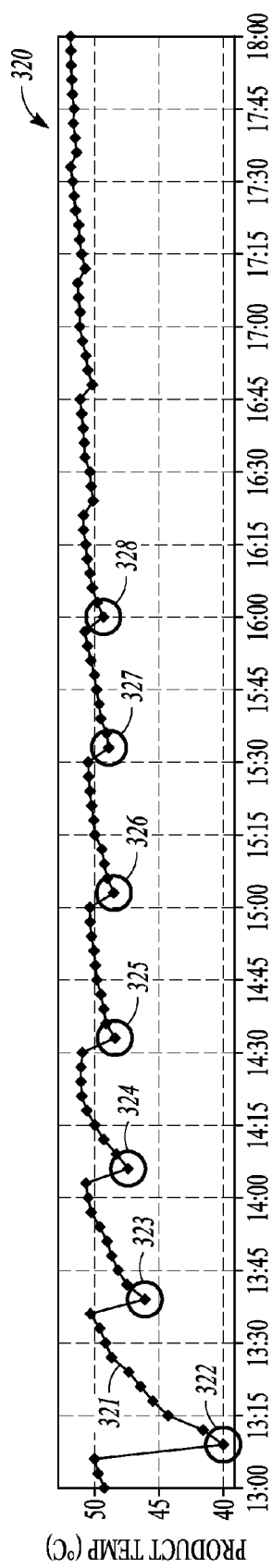
Figure 3C:
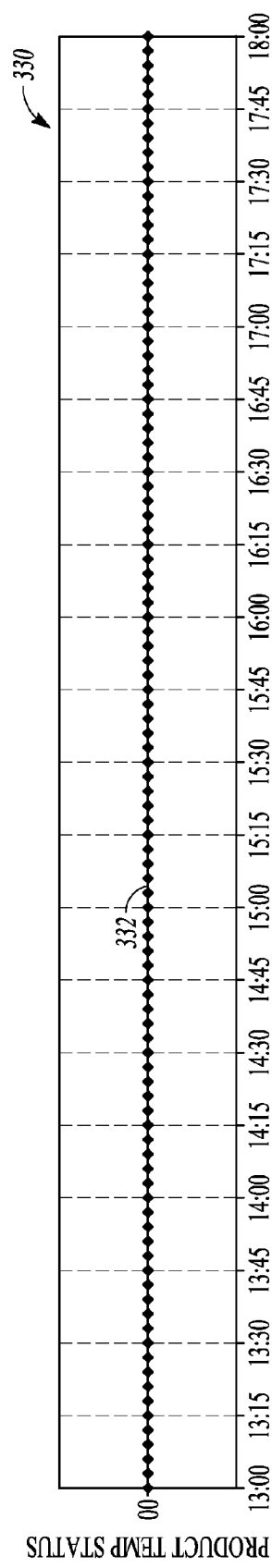

FIGS. 3A, 3B, 3C depict an illustration of three correlated sets of data collected from a monitoring system, including product level 310 in FIG. 3A, product temperature 320 in FIG. 3B, and product temperature sensor status 330 in FIG. 3C over a period of time. The product temperature status indicates a reportable operating condition of the sensor 332, with status 00 indicating normal operation throughout the period of monitoring. Thus, the product temperature sensor appears at first view to be operating normally.

As shown in the product level measurement 310, the product level 312 has gradually increased over a period of time without any fluctuation. However, the product temperature 320 has experienced a number of fluctuations in the temperature measurement 321, as shown with a variety of dramatic drops at data points 322, 323, 324, 325, 326, 327, and 328.

Given the known quantities of the petrochemical product, the gradual product level changes, and the sensor status, these drops may be determined as the result of an incorrect sensor configuration, such as incorrect parameters programmed to the sensor. If these data anomalies are detected, a user can be alerted to the incorrect operation of the appropriate field instrument, and corrections or replacements can be made in connection with the temperature sensor or appropriate storage equipment.

The following describes specific algorithms applied to filter the data measured by a field instrument, with the goal to automatically detect any abnormal event or data anomaly originating from a field instrument. An abnormal event originating from a field instrument may indicate a fault, but not all abnormal events are faults. Some examples of abnormal events include no data, a data jump (e.g., a temperature jump, level jump, or other rapid change exceeding a maximum limit, either in a positive or negative direction), data with an abnormally low numeric value (e.g. a too-low product temperature relative to the properties of the product, or a too-low product level, such as a negative product level), data with an abnormally high numeric value (e.g., a too-high product temperature for the properties of the product, too-high vapor temperature, too-high product pressure, too-high vapor pressure, and the like), and noisy data.

In a specific example of a filtering algorithm, the original data is first smoothed (low-pass filtered) (e.g., using an EWMA (Exponentially Weighted Moving Average) filter with a specific value of forgetting factor (smoothing constant). Second, a high-pass filtered data is obtained by subtracting the low-pass filtered data from the original data. Third, the high-pass filtered data is used to compute the mean value M and standard deviation S. Fourth, the upper control limit (UCL) and lower control limit (LCL) are computed as M+(3*S) and M−(3*S), respectively. Fifth, any sample of the high-pass filtered data whose value (amplitude) is greater than the UCL or lower than the LCL is regarded as invalid data.

Figure 4A:
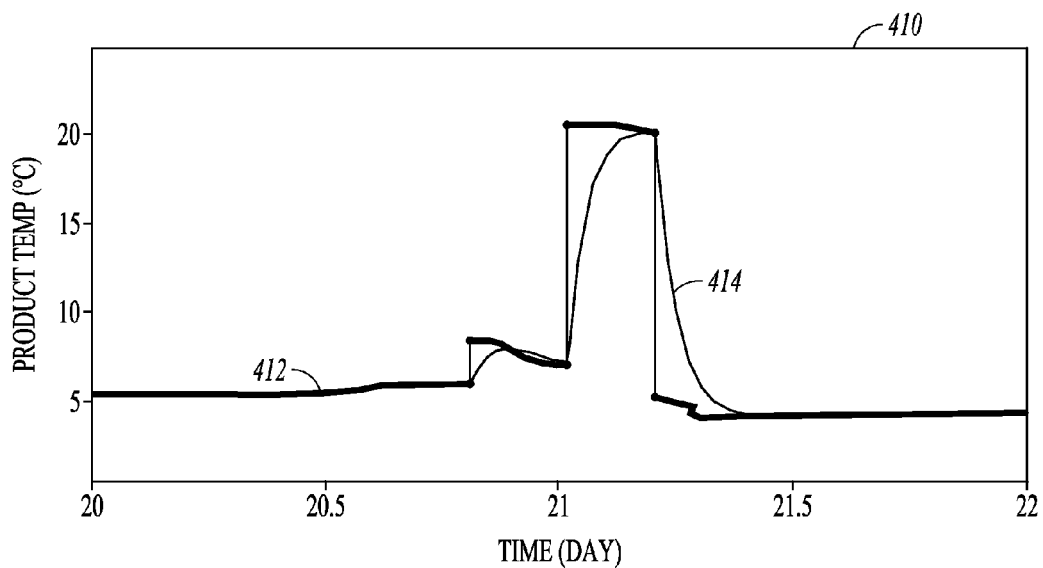
FIGS. 4A and 4B depict example graphs of a filtering algorithm recognizing data jumps produced by field instruments monitored in connection with an example embodiment of a monitoring system.
Figure 4B:
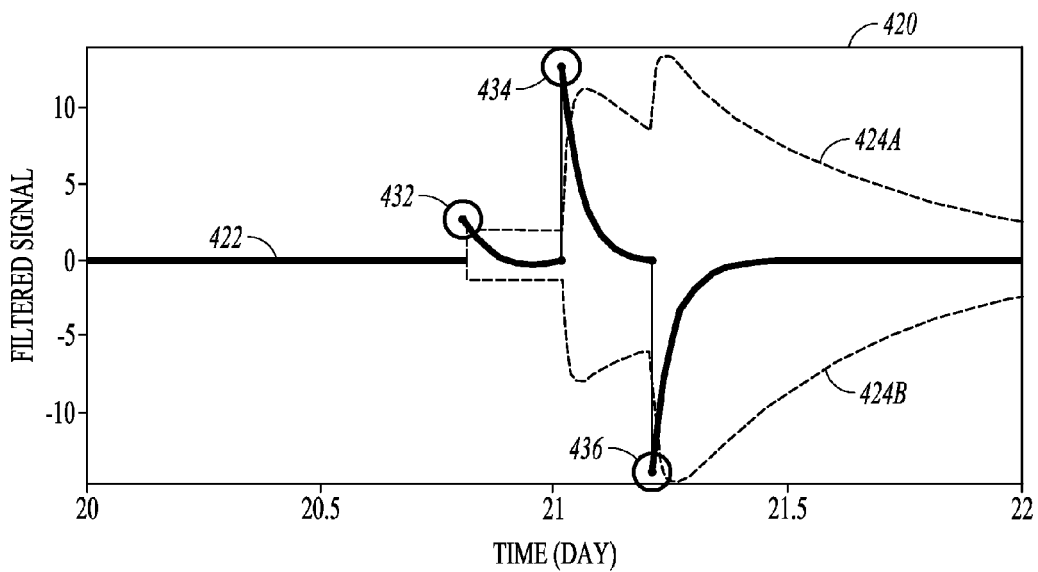

FIGS. 4A and 4B provide a graphical illustration of data jump filtering used in connection with a presently described embodiment. First, as shown in product temperature graph 410 in FIG. 4A, the product temperature measurement 412 has a variety of significant changes occurring approximately at times 20.8, 21.05, and 21.2. An exponentially weighted moving average of this data 414 (by using $\lambda_1=0.95$) may be computed.

As shown in filtered signal graph 420 in FIG. 4B, the filtered temperature measurement 422 (i.e., the high-pass filtered data) is compared with an upper control limit 424A and a lower control limit 424B. As illustrated, at three points 432, 434, 436, the filtered signal exceeds the control limits. The data then may be recognized as invalid at points 432, 434, 436.

A variety of empirical rules may also be performed in connection with the previously described algorithm to provide more accurate or more focused indications of invalid data samples. In one embodiment, a data jump detection algorithm may require satisfaction of a set of empirical rules, such as an empirical rule requiring the difference between two successive samples of raw data to be greater than a deadband parameter D. For example, given algorithm parameters deadband D (sensor-specific), sensitivity K (e.g., 3), maximum variance threshold $T_1$ (e.g., 3), maximum kurtosis threshold $T_2$ (e.g., 6), and forgetting factors $\lambda_1, \lambda_2, \lambda_3, \lambda_4, \lambda_5$ (where forgetting factor $\lambda$ is between 0 and 1, e.g. 0.95, 0.995, etc.), the following computational model may be used:

1. $z[k]=F\{x[k]\}$, where a filtering operation $F\{\ \}$ can be represented by: $z[k]=x[k]-\mu_x[k]=x[k]-(\lambda_1\mu_x[k-1]+(1-\lambda_1)\cdot x[k])$ or by: $z[k]=x[k]-x[k-1]$, or by other filtering method.
2. $\mu_z[k]=\lambda_2\cdot\mu_z[k-1]+(1-\lambda_2)\cdot z[k]$
3. $\sigma_z^2[k]=\lambda_3\cdot\sigma_z^2[k-1]+(1-\lambda_3)\cdot(z[k]-\mu_z[k])^2$
4. $U[k]=\mu_z[k]+K\cdot\sqrt{\sigma_z^2[k]}$
5. $L[k]=\mu_z[k]-K\cdot\sqrt{\sigma_z^2[k]}$
6. $\sigma_x^2[k]=\lambda_4\cdot\sigma_x^2[k-1]+(1-\lambda_4)\cdot(x[k]-\mu_x[k])^2$
7. $\beta_x[k]=\lambda_5\cdot\beta_x[k-1]+(1-\lambda_5)\cdot[(x[k]-\mu_x[k])^4/(\sigma_x^2[k])^2]$ The following nomenclature may be used: k is the discrete time (data sample index), x[k] is the k-th sample of the data, x[k−1] is the (k−1)-th sample of the data, z[k] is the k-th sample of the filtered data, $F\{\ \}$ is a filtering operation, $\mu_x$ is the mean value of x, $\mu_z$ is the mean value of z, $\sigma_x^2$ is the variance of x, $\sigma_z^2$ is the variance of z, U[k] is the k-th sample of the upper control limit, L[k] is the k-th sample of the lower control limit, and $\beta_x[k]$ is the kurtosis of x.

The reasoning model for operation of the data jump detection algorithm may operate as follows:
If $z[k]\geq U[k]$ or $z[k]\leq L[k]$, then $R_1$ is true;
If $|x[k]-x[k-1]|\geq D$, then $R_2$ is true;
If $R_1$ is true and $R_2$ is true, then x[k] is regarded as an invalid sample due to a presence of a data jump at the sample x[k].

The reasoning model for operation of the noisy data detection algorithm may operate as follows:
If $\sigma_x^2[x]\geq T_1$, then $R_3$ is true;
If $\beta_x[k]\geq T_2$, then $R_4$ is true;
If $R_3$ is true or $R_4$ is true, then x[k] is regarded as an invalid sample due to noisy data occurring at the sample x[k].

Stored statistics in memory may be used in the next iteration of the algorithm:

$x[k], \mu_x[k], \mu_z[k], \sigma_x^2[k], \sigma_z^2[k], \beta_x[k]$

Additionally, when x[k] is missing (no data), then:

$\mu_x[k]=\mu_x[k-1]$ $\mu_z[k]=\mu_z[k-1]$ $\sigma_x^2[k]=\sigma_x^2[k-1]$ $\sigma_z^2[k]=\sigma_z^2[k-1]$ $\beta_x[k]=\beta_x[k-1]$ The algorithm is initialized (at the sample time k=1) using the following constants:

$\mu_x[1]=0$ $\mu_z[1]=0$ $\sigma_x^2[1]=0$ $\sigma_z^2[1]=0$ $\beta_x[1]=0$

The previously described high-pass and low-pass filtering operation is only one example of an applicable filter used in the algorithm. The filter utilized in the filtering operation may be a combination of one or more frequency filters (e.g., a low-pass, high-pass, band-pass, or band-stop filter), non-linear filters (e.g., a median-based, or percentile-based filter), a weighted averaging filter, a wavelet filter, a frequency-domain thresholding filter, a wavelet-domain thresholding filter, a cepstrum-domain thresholding filter, an adaptive linear filter, an adaptive non-linear filter, or any other linear or non-linear filter with either fixed or adaptive filter coefficients implemented using either recurrent or block-wise computation.

The previously described mean value, variance, and kurtosis are only examples of applicable statistical indicators used in the algorithm. The statistical indicator may be a combination of one or more statistical indicators, and may involve a higher-order moment, a statistical distance, a correlation coefficient, information entropy, and the like.

Figure 5:
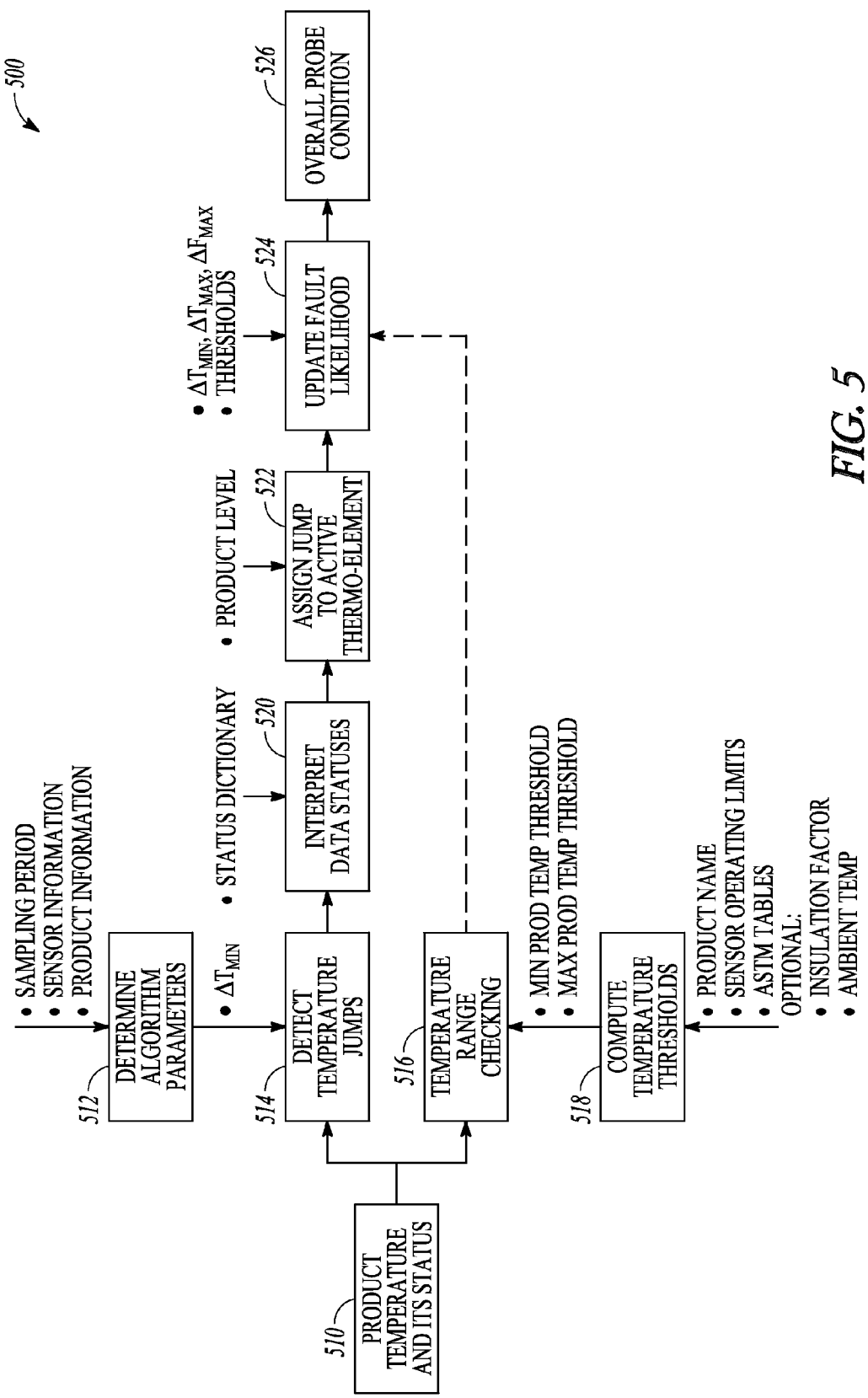
FIG. 5 depicts an example block diagram of a series of data processing steps performed in connection with an example embodiment of a monitoring system.

The workflow of algorithmic steps, as well as the previously described steps of detecting invalid data and invalid data changes generated by a broad range of sensors, provides the ability to detect and respond to invalid and anomalous data points. FIG. 5 provides an illustration of a series of data processing steps 500 performed in connection with a product temperature field instrument, used to produce an overall probe condition that factors the fault likelihood of the instrument and other relevant data inputs. The same general detection mechanism may be used for various sensor types, with fine-tuning to various sensor or product types with specific parameters as appropriate.

As shown in FIG. 5, product temperature and product temperature status 510 are provided as input to a series of data processing checks, (the detection of temperature jumps 514 and temperature range checking 516). If the temperature jumps are significant, or the temperature is out of a normal range, then this information may be used to identify anomalous data from a specific field instrument. As input to verification of the temperature range 516, minimum and maximum product temperature thresholds may be computed 518. These range computations may originate based on the type of product, the sensor operating limits, ASTM tables, and optional factors such as an insulation factor and ambient temperature. Likewise, as input to the determination of data jump algorithm parameters 512, parameters such as a sampling period, sensor information, and product information may be factored to determine a minimum temperature change $\Delta T_{min}$, which represents an example of the deadband parameter D in case of temperature sensors.

Further processing may be performed in connection with data jump detections, such as an operation for factoring or interpreting data statuses 520. This may include checking the status of the field instrument, such as product temperature status or other data statuses, against a status dictionary to determine if the sensor was reporting a normal status. Other processing 522, such as assigning a temperature jump to the currently active element (such as a specific thermoelement in an element array), may be performed based on the correlation to the measured product level and other parameters and data points. For example, relevant parameters may include product immersion depth (e.g. 500 mm), gas immersion depth (e.g. 500 mm), temperature element offset (e.g. 300 mm), switch hysteresis (e.g. 100 mm), and the like.

Based on the various detections 514, 520, 522 (or, alternately, the temperature range detection 516), the fault likelihood of a specific field instrument may be provided or updated 524. The fault likelihood determination may factor $\Delta T_{min}$ (minimum temperature change), $\Delta T_{max}$ (maximum temperature change), and $\Delta F_{max}$, (maximum fault likelihood change). Remedial action may be undertaken based on a predetermined threshold of fault or the change of the fault likelihood. Based on the likelihood of fault, a generation of an overall probe condition status update 526 and associated processing may occur.

The presence of invalid data may be reported to the user (e.g., tank owner, service engineer, maintenance technician, etc.) by appropriate means (e.g., error message, specific data status, etc). The analysis provided by the diagnostic system may also support sensor maintenance decisions by providing a prioritized list of sensors, such as being ordered by total number of detected anomalies, severity of worst detected anomaly, minimum/maximum sensor reading, and the like.

In further embodiments, the presently disclosed monitoring system can identify a faulty sensor within a field instrument comprising an array of sensors. For example, the monitoring system may identify a faulty temperature element in an array of temperature elements by identifying and assigning a detected temperature data jump to a specific active temperature element. This may include factoring the measured product level and known positions of the temperature elements to derive which element is producing faulty data.

In still further embodiments, detected anomalies from multiple sensors in a single tank may be synchronized in time. For example, if the tank is shaking, more sensors within the tank are likely to generate anomalies simultaneously. Also, detected anomalies from multiple tanks in proximity to each other may be synchronized in time. For example, in case of power failure, an anomaly may be detected as occurring at the same time in multiple tanks.

A variety of other improvements may be provided to the presently disclosed techniques to enable correlation of complex instrument fault and error settings. This includes techniques for correlating the detected level jumps with measured wind speed in order to reject false alarms (i.e., level jumps caused by excessive wind or weather conditions instead of a sensor fault). Level jumps detected by an algorithm also may be synchronized in time with measured wind speed or other weather conditions; for example, if the wind speed is too high, the detected level jump is regarded as correct behavior, not originating from a sensor fault, but the result of product movement.

Other correlation improvements may include detecting a faulty temperature probe by correlating measured product temperature with ambient temperature and detecting significant unexpected changes of product temperature. Still other correlation improvements may include detecting a faulty temperature probe by comparing the measured product temperature with expected temperature limits of the stored product. Expected temperature limits may be obtained either from prior physical knowledge (e.g. boiling temperature, melting temperature, flash temperature, auto-ignition temperature, and the like) or by statistical analysis of historical data (determining normal temperature limits from data measured by a fault-free temperature probe). A similar mechanism may be used for vapor temperature and expected vapor temperature limits.

A combination of the previously described techniques, and the algorithm to detect invalid sensor data, may be employed in online and offline processing scenarios. First, an online version of the algorithm may be intended for running in a hardware device (e.g., an interface unit communicating with field instruments and transmitting the data into a supervisory software application). In this case (online version), the algorithm may be optimized for processing the data on the sample-by-sample basis.

Alternately, the offline version of the algorithm can run in a personal computer or other computing device as part of a software application to analyze the archived historical datasets. For example, this would be useful to analyze data collected from multiple tanks over several months. In this case, the algorithm may be optimized for processing the data on a batch basis.

The presently disclosed techniques may also be incorporated into a larger condition based maintenance (CBM) or site device monitoring (SDM) system that is intended for monitoring a plurality of field instruments from a plurality of subsystems and sites. For example, in connection with a monitoring engine running on a hardware platform, the presently described filtering algorithm may perform various diagnostic tasks to automatically detect abnormal behavior in specific field instruments or in subsystems having multiple field instruments. This hardware platform may be responsible for other processing tasks, such as field scanning, inventory calculations, alarming, and the like. Identified faults and other relevant information regarding the detection of faults from field instruments may be provided to various analytical components in the CBM or SDM system, as data is further processed, communicated, and even visualized to end users, as appropriate. The presently disclosed filtering and detection algorithms and techniques may be used as a replacement for, or in conjunction to, existing CBM anomaly detection and processing techniques.

Figure 6:
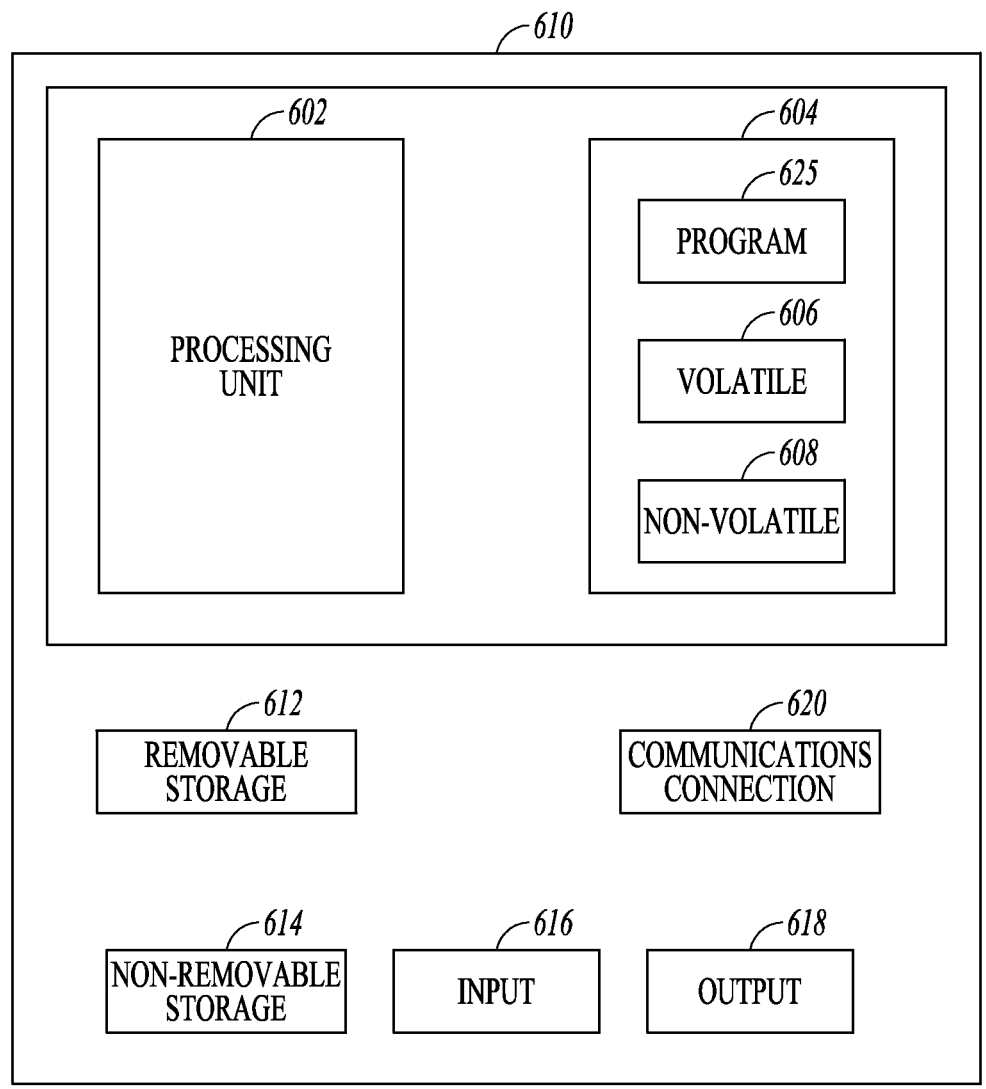
FIG. 6 depicts a block diagram of an example computer system that performs data analysis from various sensors in connection with an example embodiment of a monitoring system.

A block diagram of an example computer system that performs data analysis from various sensors, and is configured to implement the presently described algorithm (in either the online or offline scenarios) and execute other programming, is shown in FIG. 6. A general computing device in the form of a computer 610 may include a processing unit 602, memory 604, removable storage 612, and non-removable storage 614. Memory 604 may include volatile memory 606 and non-volatile memory 608. Computer 610 may include, or have access to a computing environment that includes, a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVDs) or other optical disk storage, magnetic cassettes, magnetic tapes, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers. The remote computer may include a personal computer (PC, server, router, network PC, a peer device or other common network node, or the like. The communication connection may include a Local Area Network (LAN), a Wide Area Network (WAN) or other networks.

Computer-readable instructions to execute methods and algorithms described above may be stored on a computer-readable medium, such as illustrated at a program storage device 625, are executable by the processing unit 602 of the computer 610. A hard drive, CD-ROM, and RAM are some examples of articles including a computer-readable medium. In one embodiment, a user interface is provided, such as a touchscreen device for providing both input 616 and output 618.

Although the previously described embodiments are described with reference to specific sensor deployment settings, those skilled in the art would recognize that the presently described techniques may be deployed in a number of settings to process and detect invalid data.

What is claimed is:

1. A sensing system comprising:
a field instrument; and
a processing component operably coupled to the field instrument and configured to identify faults in operation of the field instrument, by:
processing data collected from the field instrument to produce a plurality of samples;
identifying a fault-indicating sample of the data using an algorithm, the algorithm configured to identify the fault-indicating sample of the data from the plurality of samples, wherein operations to perform the algorithm upon the plurality of samples include operations comprising:
performing a filtering operation on the data from the plurality of samples to generate filtered data samples for the field instrument, wherein the filtered data samples represent actual, non-simulated data measurements collected exclusively from the field instrument;
computing a mean value M and standard deviation S from the filtered data samples for the field instrument;
computing an upper control limit and lower control limit using the mean value M and standard deviation S; and
identifying the fault-indicating sample from the filtered data samples for the field instrument, the fault-indicating sample providing one or more values greater than the upper control limit or lower than the lower control limit and satisfying a set of one or more empirical rules, wherein the set of empirical rules includes a rule requiring a difference between two or more successive samples of the data measurements collected exclusively from the field instrument to exceed a threshold value; and
determining a numerical likelihood of a fault occurring in the field instrument from a combination of: a previously determined numerical likelihood of a fault for the field instrument obtained from analysis of other data collected from the field instrument at a previous time, with a current numerical likelihood of a fault determined from processing the one or more values indicated by the fault-indicating sample of the data.

2. The system of claim 1, further comprising:
a plurality of additional field instruments;
wherein the processing component is further configured to identify faults in operation of the field instrument or the plurality of additional field instruments by:
processing the data collected from the field instrument and the plurality of additional field instruments using an online process in real time; and
correlating the fault-indicating sample of the data to one or more specific field instruments.

3. The system of claim 1, wherein the field instrument is one of: a product level gauge, temperature probe, water level probe, pressure transmitter, or flowmeter.

4. The system of claim 1, wherein the data measured by the field instrument includes one or more of: product level, product temperature, product pressure, product flow, vapor temperature, vapor pressure, product density, water level, or weather data.

5. The system of claim 1, wherein the field instrument comprises an array of field instrument elements, and wherein the processing component is further configured for identifying a detected change and the likelihood of fault for a specific element in the array of field instrument elements by factoring one or more measurements obtained from field instruments external to the array of field instrument elements.

6. The system of claim 1, wherein the filtering operation is performed by one or more filters, the filters including at least one of: a low-pass frequency filter, a high-pass frequency filter, a band-pass frequency filter, a band-stop frequency filter, a median-based non-linear filter, a percentile-based non-linear filter, a weighted averaging filter, a wavelet filter, a frequency-domain thresholding filter, a wavelet-domain thresholding filter, a cepstrum-domain thresholding filter, an adaptive linear filter, and an adaptive non-linear filter.

7. The system of claim 1, the algorithm further comprising computing one or more statistical indicators from the data and the filtered data samples;
   wherein the set of empirical rules is applied to the data, the filtered data samples and the one or more statistical indicators; and
   wherein the set of empirical rules includes a rule requiring a difference between two or more successive samples of the filtered data samples to exceed a threshold value, a rule requiring one or more statistical indicators of the data to exceed a corresponding threshold value, and a rule requiring one or more statistical indicators of the filtered data samples to exceed a corresponding threshold value; and
   wherein a threshold value is one of: a fixed threshold, a fuzzy threshold, a time-varying threshold, and an adaptive threshold.

8. The system of claim 1, the processing component further configured to:
   report incidences of the fault-indicating sample of the data to a user; and
   notify a user after the likelihood of a fault exceeds a predefined threshold.

9. The system of claim 1, wherein determining a likelihood of a fault occurring in the field instrument includes factoring one or more of:
   a previously determined likelihood of a fault for the field instrument, or
   data collected from other field instruments located proximate to a location of the field instrument.

10. A processing system configured to process data collected from a plurality of field instruments, the processing system comprising:
   a processor;
   memory operably coupled to the processor;
   instructions for execution within the processing system with use of the memory and the processor, the instructions configured to:
     process data originating from a plurality of field instruments to produce a plurality of samples;
     identify multiple fault-indicating samples of the data using an algorithm applied to individual data sets, the individual data sets produced from actual, non-simulated data measurements at each respective field instrument of the plurality of field instruments, the algorithm configured to identify the fault-indicating samples of the data within the plurality of samples of the data, by detecting data changes among the plurality of samples from the data that are exceeding a maximum limit within a period of time;
     correlate the multiple fault-indicating samples of the data to one or more specific field instruments in the plurality of field instruments; and
     determine a numerical likelihood of a fault occurring in each of the one or more specific field instruments based on a combination of:
       values indicated by the multiple fault-indicating samples of the data,
       a status of the specific field instruments, and
       data collected from other instruments in the plurality of field instruments that are located proximate to the specific field instruments.

11. The processing system of claim 10, wherein the algorithm as applied to instrument data for a particular field instrument comprises:
   performing a filtering operation on the instrument data to generate filtered data samples for the particular field instrument, wherein the filtered data samples represent actual, non-simulated data measurements collected exclusively from the particular field instrument;
   computing a mean value M and standard deviation S from the filtered data samples for the field instrument;
   computing an upper control limit and lower control limit using the mean value M and standard deviation S;
   computing one or more statistical indicators from the instrument data and the filtered data samples; and
   identifying the fault-indicating sample from the filtered data samples for the field instrument, the fault-indicating sample having values greater than the upper control limit or lower than the lower control limit and satisfying a set of empirical rules applied to the instrument data, the filtered data samples, and one or more statistical indicators;
   wherein the filtering operation is performed by one or more filters, the filters including at least one of: a low-pass frequency filter, a high-pass frequency filter, a band-pass frequency filter, a band-stop frequency filter, a median-based non-linear filter, a percentile-based non-linear filter, a weighted averaging filter, a wavelet filter, a frequency-domain thresholding filter, a wavelet-domain thresholding filter, a cepstrum-domain thresholding filter, an adaptive linear filter, or an adaptive non-linear filter; and
   wherein the set of empirical rules includes a rule requiring a difference between two or more successive samples of the instrument data to be greater than a deadband parameter D, a rule requiring a difference between two or more successive samples of the filtered data samples to be greater than a deadband parameter, a rule requiring one or more statistical indicators of the instrument data to be greater than a corresponding maximum threshold, and a rule requiring one or more statistical indicators of the filtered data samples to be greater than a corresponding maximum threshold; and
   wherein the threshold value is one of: a fixed threshold, a fuzzy threshold, a time-varying threshold, or an adaptive threshold.

12. The processing system of claim 10, wherein determining a likelihood of a fault occurring in each of the one or more specific field instruments includes factoring one or more of:
   a previously determined fault likelihood for the specific field instruments; or
   a location of the specific field instruments in relation to other instruments in plurality of field instruments.

13. The processing system of claim 10, wherein at least one of the specific field instruments comprises an array of field instrument elements, and wherein the processing component is further configured for identifying a detected change and the likelihood of fault for a specific element in the array of field instrument elements by factoring one or more measurements obtained from field instruments external to the array of field instrument elements.

* * * * *